United States Patent
Maier et al.

(10) Patent No.: US 6,776,140 B2
(45) Date of Patent: Aug. 17, 2004

(54) FUEL SUPPLY INSTALLATION IN THE FORM OF A COMMON-RAIL SYSTEM OF AN INTERNAL COMBUSTION ENGINE HAVING A PLURALITY OF CYLINDERS

(75) Inventors: Ludwig Maier, Diedorf (DE); Christian Vogel, Augsburg (DE); Christoph Schrott, Augsburg (DE); Matthias Söngen, Augsburg (DE); Jaroslav Hlousek, Golling (DE); Bernd Kögler, Hallein (DE); Christian Graspeunter, Hallein (DE); Hagen Sassnik, Puch (DE)

(73) Assignee: Man B&W Diesel Aktiengesellschaft, Augsbirg (DE)

( * ) Notice: Subject to any disclaimer, the term of this patent is extended or adjusted under 35 U.S.C. 154(b) by 67 days.

(21) Appl. No.: 10/301,307

(22) Filed: Nov. 21, 2002

(65) Prior Publication Data

US 2003/0094158 A1 May 22, 2003

(30) Foreign Application Priority Data

Nov. 21, 2001 (DE) .......................................... 101 57 135

(51) Int. Cl.$^7$ ............................................. F02M 33/04
(52) U.S. Cl. ..................... 123/456; 123/468; 123/447
(58) Field of Search ................................. 123/468, 469, 123/456, 447

(56) References Cited

U.S. PATENT DOCUMENTS

| | | | |
|---|---|---|---|
| 5,511,527 A | * 4/1996 | Lorraine et al. | ............ 123/456 |
| 5,513,613 A | * 5/1996 | Taylor et al. | ............ 123/456 |
| 6,220,224 B1 | 4/2001 | Matthies et al. | ............ 123/468 |
| 6,240,901 B1 | 6/2001 | Jay | ............ 123/446 |
| 6,276,336 B1 | 8/2001 | Krüger et al. | ............ 123/456 |
| 2002/0170508 A1 | 11/2002 | Joos et al. | ............ 123/41.31 |

FOREIGN PATENT DOCUMENTS

| | | | |
|---|---|---|---|
| DE | 195 32 599 | 3/1997 | .......... F02M/55/04 |
| DE | 196 45 243 | 10/1998 | .......... F02M/53/00 |
| EP | 0 959 245 | 11/1999 | .......... F02M/55/02 |
| EP | 0 990 792 | 4/2000 | .......... F02M/63/02 |
| EP | 1 150 006 | 10/2001 | .......... F02M/65/100 |

* cited by examiner

Primary Examiner—Thomas N. Moulis
(74) Attorney, Agent, or Firm—Cohen, Pontani, Lieberman & Pavane

(57) ABSTRACT

Fuel is conveyed by at least one high-pressure pump from a low-pressure region into a high-pressure region including a pressure-accumulator line consisting of at least two separate accumulator units connected to one another by means of feed lines, and to fuel injectors for the cylinders. The accumulator units each have an accumulator volume for serving at least two cylinders, and accumulator covers provided on both end faces. All the functional units are integrated into these accumulator covers in terms of fuel delivery and transfer, and at least one separate pump accumulator is arranged in the high-pressure region between the high-pressure pump and the assembled pressure-accumulator line. The pump accumulator is connected to at least one accumulator cover of an accumulator unit of the pressure-accumulator line for fuel conveyance and is capable of being acted upon by at least one high-pressure pump.

18 Claims, 6 Drawing Sheets

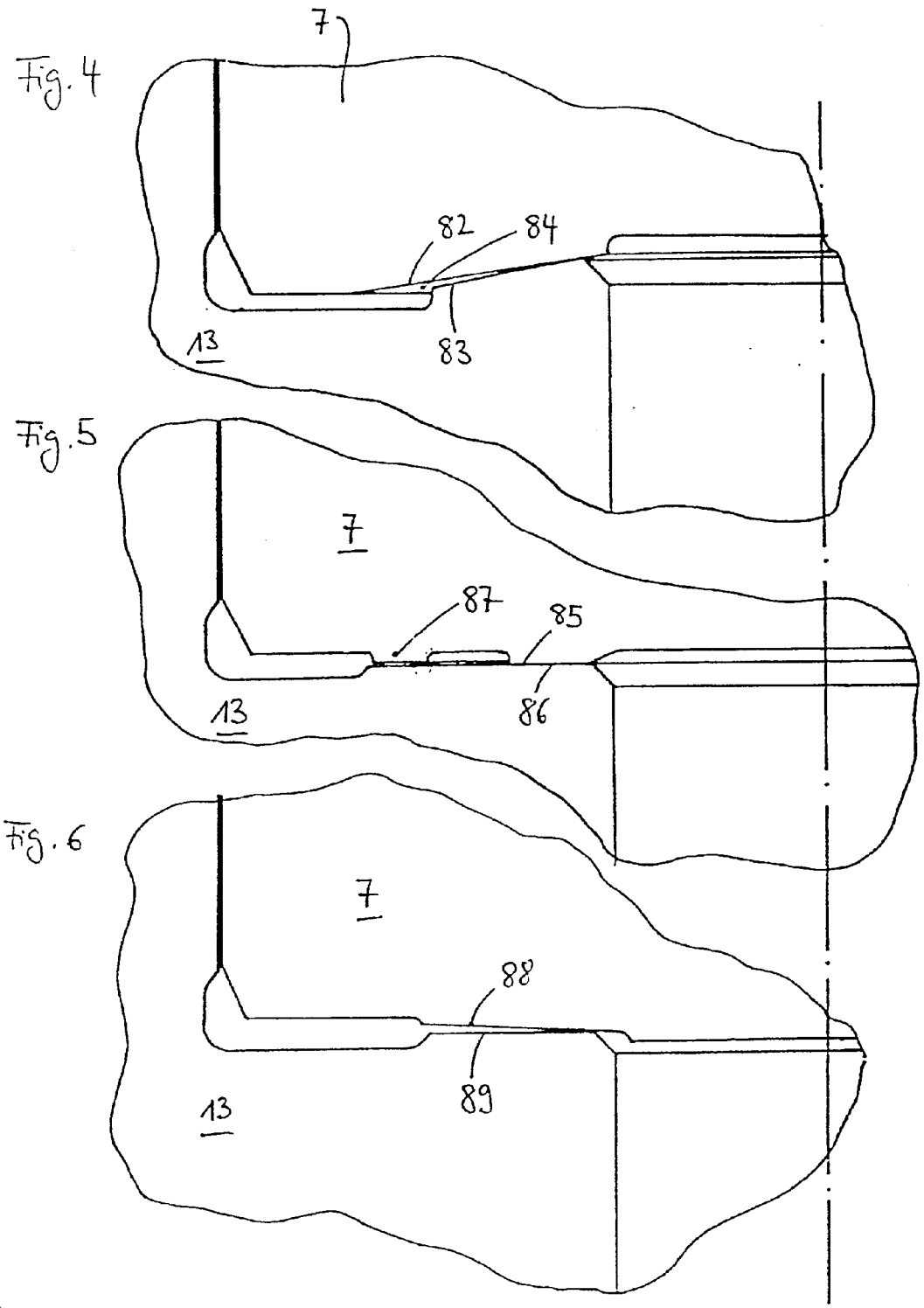

FUEL SUPPLY INSTALLATION IN THE FORM OF A COMMON-RAIL SYSTEM OF AN INTERNAL COMBUSTION ENGINE HAVING A PLURALITY OF CYLINDERS

BACKGROUND OF THE INVENTION

1. Field of the Invention

The invention relates to a fuel supply installation in the form of a common-rail system of an internal combustion engine having a plurality of cylinders, in particular a large diesel internal combustion engine operated preferably with heavy oil, wherein the fuel is conveyed by a pumping device from a low-pressure region into a high-pressure region, the high-pressure region comprising a pressure-accumulator line consisting of at least two separate accumulator units connected to one another by means of feed lines, and fuel injectors for the cylinders are connected to the accumulator units. The invention also relates to individual components of a common-rail system which are suitable in a particularly advantageous way for use in a fuel supply installation according to the invention.

2. Description of the Related Art

This fuel supply installation is to be used, in particular, in large diesel internal combustion engines operated with heavy oil. As is known, because of the problematic corrosion and viscosity properties of heavy oil (tendency to paraffin separation, particularly at low temperature, when the internal combustion engine is in the state of rest), the engine and the fuel supply installation have to satisfy special preconditions. Conventionally, therefore, when a fuel supply installation suitable for heavy-oil operation is used, there is a change-over to operation with diesel fuel before the engine stops, so that the feed lines and the components of the fuel supply installation, such as high-pressure pumps, pressure-accumulator line or fuel injectors, still contain only diesel which presents no problems as regards viscosity and paraffin separation. It is also known to heat up the heavy oil itself and the fuel injectors during lengthy rest periods by means of heating and thus prevent paraffin formation.

U.S. Pat. No. 6,240,901 discloses such a fuel supply installation. The functioning of the fuel injectors is controlled electronically, in particular by means of magnetic valves, in order to ensure sufficiently brief and accurate injection. This addresses the problem involved in using a common-rail system in a large diesel internal combustion engine in terms of a constant accumulator pressure (pressure waves) for all the cylinders along the engine axis on account of the length of the pressure-accumulator line which is necessary in this case. Consequently, a pressure-accumulator line consisting of at least two separate accumulator units connected to one another by means of connecting lines has already been produced, the accumulator units being capable in each case of being connected to at least two fuel injectors and in each case of being acted upon by a separate high-pressure pump.

Nevertheless, when the engine is in operation, problems continue to be expected, particularly with regard to the strength of the individual accumulator units, since the feed lines connecting them to one another issue as radial bores and form weak points there and therefore put at risk the stability of the common rail. Furthermore, a greater flexibility in the assembly of the components of the fuel supply installation would be desirable, since the number of accumulator units is linked to the number of high-pressure pumps and their assignment cannot be selected according to the existing space availability, particularly where retrofit solutions are concerned. Moreover, pumps with large stroke volumes have had to be used hitherto, in order to ensure a sufficiently large feed quantity and a sufficiently high feed pressure. This results, in turn, in considerable dynamic pressure fractions, such as pressure hammers and pressure pulsations, which give rise, in turn, to high mechanical loads on the feed lines which entail a considerable risk of damage, such as leakages or breaks.

SUMMARY OF THE INVENTION

The invention is intended to eliminate all these above-described disadvantages of the previous fuel supply installation, in particular for large diesel internal combustion engines operated with heavy oil. The object of the invention, therefore, is to provide improved components of the common-rail system which are suitable, in particular, for use in such a fuel supply installation, so that a space-saving, flexible, but nevertheless modular construction becomes possible and, moreover, the operating reliability of the complete fuel supply installation is increased in relation to the prior art.

This object is achieved, according to the invention, by means of each individual accumulator unit of the pressure-accumulator line being designed in such a way that they each have an accumulator volume for serving at most approximately two cylinders. The position of an accumulator unit along the internal combustion engine and its length can therefore be selected in such a way that the shortest possible pressure-accumulator line can be constructed. In a particularly preferred way, an accumulator unit is designed in such a way that it has in each case an accumulator volume for serving two cylinders. By accumulator covers being provided in each case on both end faces, all the functional units are integrated into these in terms of fuel delivery and transfer, retrofitting on existing engine types with common-rail injection systems has been markedly simplified. All the hydraulic connections, and holding devices for positioning the accumulator units along the internal combustion engine, and also sealing-off elements for the accumulator unit, as well as functional units, such as a quantity-limiting valve, are located in the accumulator cover, so that a modular construction becomes possible in a simple way and, furthermore, operating reliability is increased, since the accumulator units, and therefore the entire pressure-accumulator line, are free of external forces which originate from holding devices and hydraulic connections which are now received by the accumulator covers designed according to the invention.

Finally, what is also achieved by arranging at least one separate pump accumulator in the high-pressure region between the high-pressure pump and the assembled pressure-accumulator line, the pump accumulator being connected to at least one accumulator cover of an accumulator unit of the pressure-accumulator line for fuel conveyance and being capable of being acted upon by at least one high-pressure pump, is that the dynamic pressure fractions generated by the pumps can be reduced considerably before the conveyed fuel, that is to say, for example, the heavy oil, is fed into the pump lines which ultimately lead into the pressure-accumulator line. Thus, furthermore, the mechanical load on the accumulator units is markedly reduced and the operating reliability of the entire fuel supply installation is increased.

Since the accumulator volume of each accumulator unit amounts approximately to 50 to 500 times the required injection quantity per cylinder and work cycle, a modular construction of the pressure-accumulator line is promoted in a particularly advantageous way.

In an advantageous embodiment of the invention, the accumulator units of the pressure-accumulator line are connected one behind the other in the throughflow direction via the feed lines, that is to say are capable of being acted upon in series by fuel.

It is to be seen as a further advantageous embodiment of the fuel supply installation that the accumulator units of the pressure-accumulator line can receive line pipes which are laid in the axial direction and which have throttle bores, so that all the accumulator units can be acted upon in parallel by fuel.

It is to be considered as a particularly advantageous measure, furthermore, that the accumulator units are designed with an axial length which, with respect to the axis of the internal combustion engine, corresponds to the cylinder spacing with a tolerance of +/−20%.

The fuel supply installation according to the invention 15 is suitable for all types of large diesel engines, in particular for internal combustion engines operated with heavy oil. The accumulator unit according to the invention, the pumping device and the scavenging device according to the invention are suitable for all types of common-rail injection systems, but, in combination, perfect the fuel supply installation according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with 30 reference to the highly diagrammatic drawing in which:

FIGS. 3–6 show in each case a variant of the sealing geometry of the accumulator cover and accumulator unit.

DETAILED DESCRIPTION OF THE PRESENTLY PREFERRED EMBODIMENTS

Figure 1:
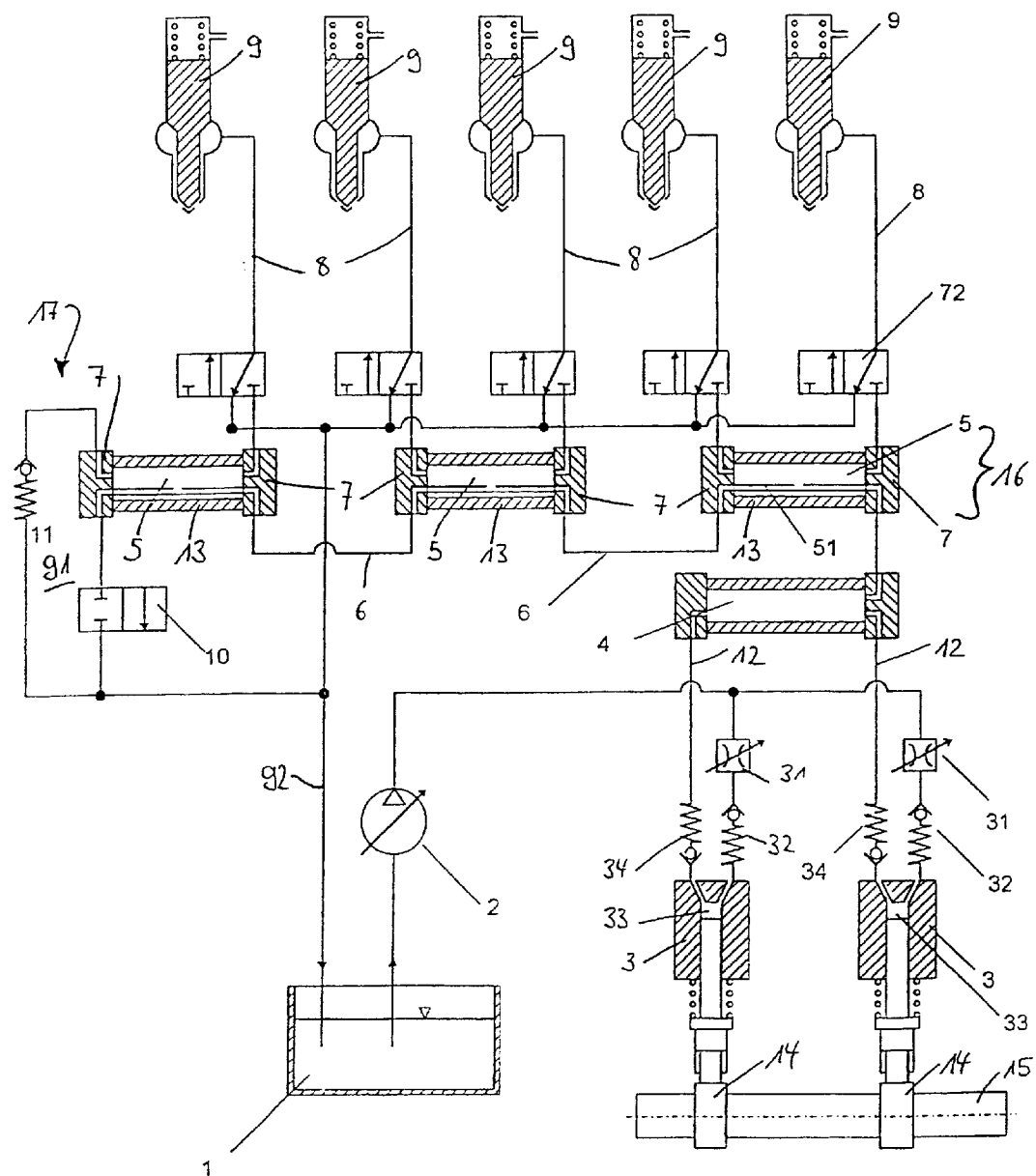
FIG. 1 shows an overall illustration of the fuel supply installation according to the invention.

The diagram according to FIG. 1 shows a modularly constructed fuel supply installation in the form of a common-rail system for an internal combustion engine, not illustrated in any more detail, which operates according to the diesel process. This diesel engine is designed to operate with heavy oil which is conveyed out of a fuel tank 1 in the low-pressure region via a fuel low-pressure system 2 by means of a plurality of high-pressure pumps 3, in each case via separate pump lines 12, into a high-pressure region which follows the high-pressure pumps 3 downstream. The internal combustion engine, not illustrated, is a five-cylinder engine in which each cylinder is assigned an injector 9.

Provided in the high-pressure region between the high-pressure pumps 3 and the injectors 9 is a pressure-accumulator line 16 which is known by the term "common rail", is constructed from three separate accumulator units connected to one another by means of feed lines 6 and is distinguished by an internal high-pressure accumulator which offers a markedly larger accumulator volume, as compared with the volume of the remaining lines 6, 12 which are under high pressure.

The accumulator units 5 are produced from pipe-like structural parts 13 with or without fittings, are sealed off in each case on the end faces by means of accumulator covers 7 and are arranged in each case, approximately level with the cylinder heads, along the internal combustion engine which is not illustrated.

Each accumulator unit 5 is connected by means of at least one high-pressure line 8 to at least one, as a rule, electronically controlled injector 9.

In the present case, one accumulator unit 5 is provided in each case for two cylinders to be served. If there are odd numbers of cylinders, as in the present instance, the accumulator unit 5 which faces away from the high-pressure pumps 5, that is to say which is last in the direction of flow, serves only one cylinder. Depending on the engine type and the application, the individual accumulator units 5 connected to one another are filled by two to four high-pressure pumps 3, in the present case by two high-pressure pumps 3, which are all combined, together with their high-pressure connection, in a pump accumulator 4.

The pump accumulator 4 is, in flow terms, introduced into the high-pressure region between the pressure-accumulator line 16 and the high-pressure pumps 3, each high-pressure pump 3 being connected to the common pump accumulator 4 in each case via a separate pump line 12.

The high-pressure pumps 3 are conventionally driven in 30 sequence by the crankshaft of the diesel engine via known mechanical means, such as cams 14 and a control shaft 15, and are therefore often arranged advantageously in the vicinity of the crank space. The resulting long pump lines 12 are then put at risk by high mechanical loads, such as pressure pulsations. The pump accumulator 4 has the essential advantage of eliminating these dynamic pressure fractions.

For the purpose of fuel conveyance, the pump accumulator 4 is connected hydraulically to an accumulator cover 7 of an accumulator unit 5, in the preferred exemplary embodiment to the first accumulator cover 7 of the first accumulator unit 5, as seen in the longitudinal direction of the pressure-accumulator line 16.

All the functional units are integrated in each 10 accumulator cover 7 of the accumulator units in terms of fuel delivery and transfer. Preferably, the accumulator volume of each accumulator unit 5 amounts approximately to 50 to 500 times the required injection quantity per cylinder and work cycle.

Arranged upstream of each of the high-pressure pumps 3 is an electromagnetically activated throttle valve 31, via which the feed quantity of each high-pressure pump 3 can be regulated. The fuel is led from the throttle valve 31 via a suction valve 32 into the pump space 33. In the conveying phase of the respective high-pressure pump 3, the suction valve 32 is closed and the fuel is forced into the pump accumulator 4 via a pressure valve 34. The fuel is guided from the pump accumulator 4, which, as already mentioned, connects the high-pressure outlets of all the high-pressure pumps 3, further on to the individual accumulator units 5. In the instance shown, there is a series connection of the accumulator units 5 without line pipes 51. Alternatively, line pipes 51, provided with one or more throttle bores, may be inserted into the accumulator units 5, so that a parallel connection to the individual accumulator units 5 is obtained. The fuel then no longer passes in succession from one accumulator unit 5 to the next, but fills the accumulators S jointly from the pipes 51 coupled via the feed lines 6. In this case, hydraulic uncoupling of the respective accumulator unit 5 may be carried out by means of throttles having a diameter of 2 to 10 mm.

The feed lines 6 connecting the accumulator units 5 to one another are dimensioned such that, under nominal load, the average pressure of the last accumulator unit 5, as seen in the throughflow direction of the feed lines 6, cannot fall more than 10% below that of the first accumulator unit, as seen in the throughflow direction. In the preferred exemplary embodiment, the accumulator units 5 are designed with an axial length which, with respect to the axis of the internal combustion engine, corresponds to the cylinder spacing with a tolerance of +/−20%.

The high-pressure pumps 3 therefore build up a predeterminable high pressure in the pressure-accumulator line 16 via the pump accumulator 4. In the exemplary embodiment illustrated in FIG. 1, a relief device 17 branches off downstream of the last accumulator unit 5, as seen in the direction of flow of fuel conveyance from the high-pressure pump 3 to the pressure-accumulator line 16, in order to return fuel into the fuel tank 1 via a fuel line. The relief device 17 is designed in the form of a safety valve 11 and of an additional scavenging valve 10. The safety valve 11 and scavenging valve 10 may also be implemented in the form of a single valve element. The scavenging valve 10 has a first and a second switching position. In the first, fuel can flow out of the pressure-accumulator line 16 into the fuel tank 1, and, in the second, the fuel must flow via the safety valve 11. The functioning of the relief device 17 is described in more detail further below.

Figure 2A:
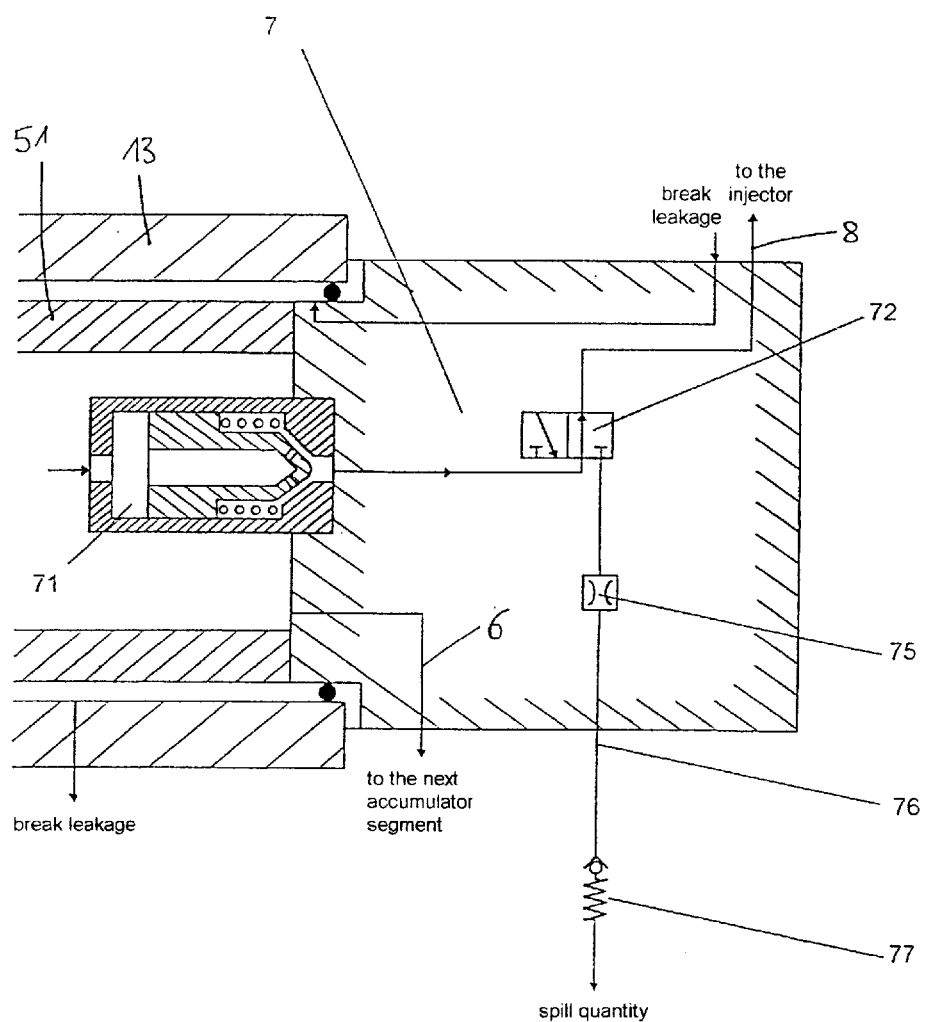
FIG. 2a shows a part-section through an accumulator unit with an accumulator cover according to the invention.
Figure 2B:
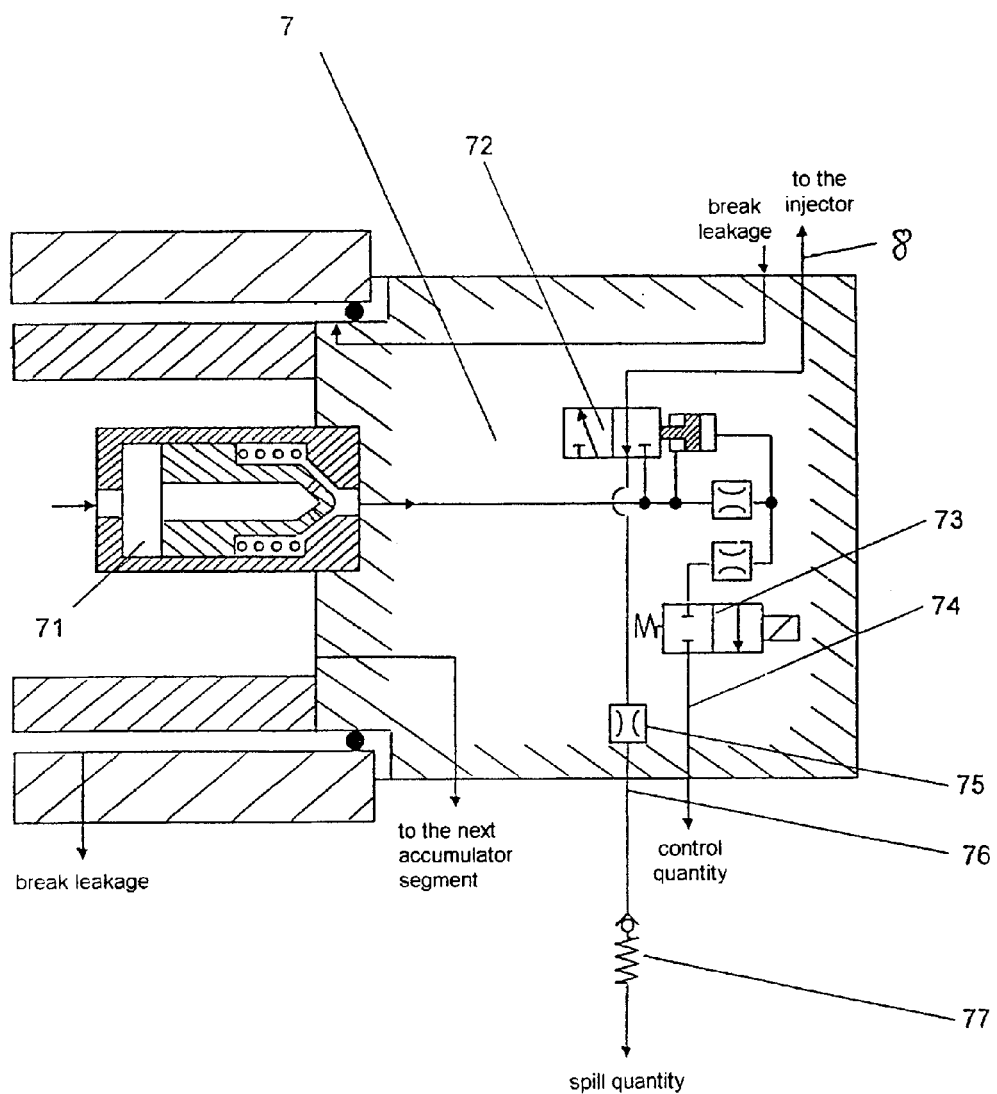
FIG. 2b shows a further design variant of the accumulator cover according to the invention.

The fuel passes from the respective accumulator unit 5 via a throughflow limiter 71 (FIG. 2) into the accumulator covers 7 (in the case of two assigned injectors 9), an accumulator cover 7 containing a plurality of functional units, as is evident from FIG. 2. Thus, injection can be controlled via a 3/2-way valve 72 which is switched directly (FIG. 2a) or is actuated indirectly (FIG. 2b) via an electromagnetically activated 2/2-way valve 73. The operating principle of the 3/2-way valve 72 is not discussed in any more detail.

According to FIG. 2b, a control leakage and a spill leakage occur during the control phase. The control leakage is discharged via line 74 and the spill leakage via a throttle 75, a line 76 and a pressure-holding valve 77. A dynamic counterpressure is built up in the spill line during the spill phase by the pressure-holding valve 77, this counterpressure reducing the spill quantity and therefore the loss quantity and counteracting cavitation. The fuel then passes from the 3/2-way valve to the connection of the high-pressure line 8 and, via the latter, to the respective injector 9 which consists of a conventional needle valve.

Should an excess pressure build up in the accumulator units 5 for whatever reason, the safety valve 11 set at a defined pressure opens and consequently protects the accumulator units 5 against inadmissibly high pressure load (FIG. 1).

As mentioned in the introduction, the fuel supply installation is provided with heating for prewarming the heavy oil.

So that the "cold" internal combustion engine can be started with heavy oil, the fuel supply installation must therefore first be warmed with the aid of warm circulating heavy oil. For this purpose, the scavenging valve 10 is opened, and the heavy oil is pumped from the low-pressure system 2 through the throttle valves 31 of the high-pressure pumps 3 into the pump spaces 33 and from there, via the pump accumulator 4 and the accumulator units 5, and via the scavenging valve 10, back to the fuel tank 1. The scavenging of the fuel supply installation in the above-described sequence may alternatively take place in the opposite direction by means of an additional scavenging valve at the high-pressure pumps 3 by the application of scavenging pressure or by the timed activation of the 3/2-way valve of the accumulator covers. Optimum scavenging can 10 be achieved when the accumulator units 5 are connected in series.

The scavenging valve 10 may be controlled in a known way hydraulically by means of a control fluid, pneumatically or by means of electromagnetic actuation.

Figure 3:
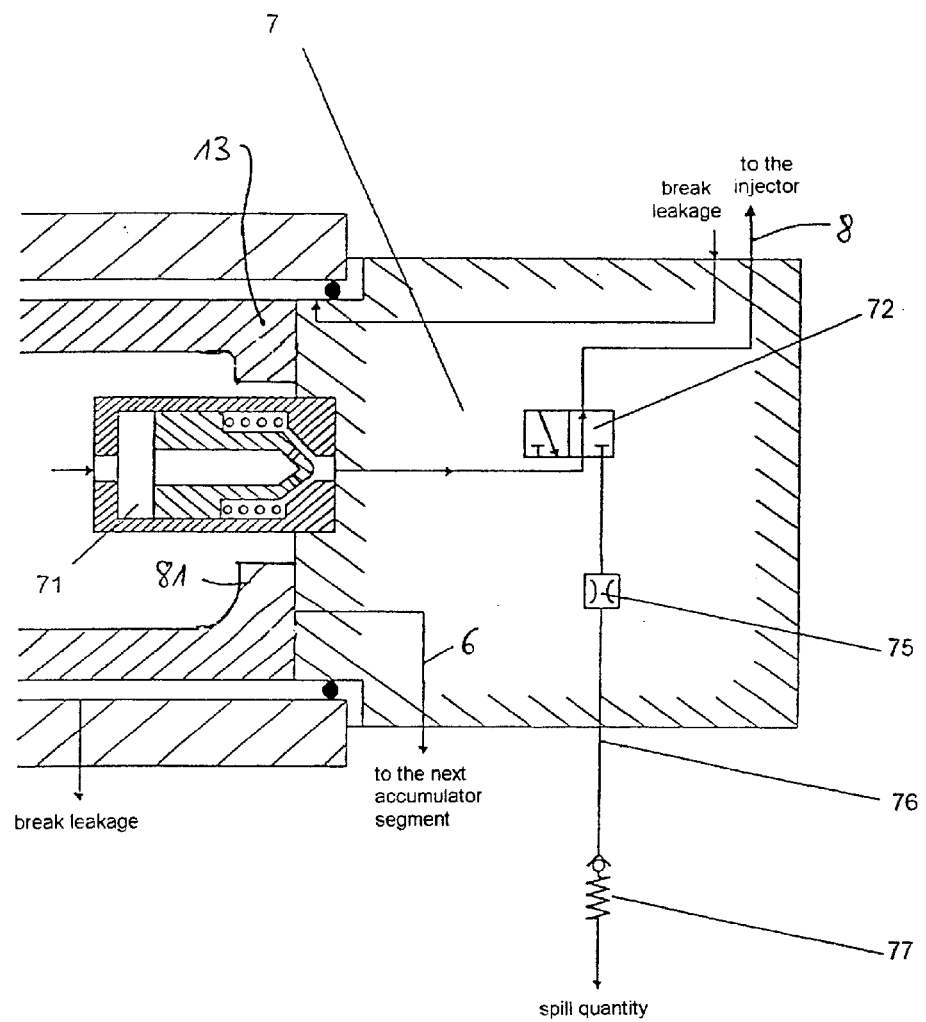

According to FIG. 3, the accumulator units 5 are designed with a pipe-shaped structural part 13, that is to say accumulator body, which may alternatively be provided on the two end faces with a taper, that is to say a cross-sectional narrowing 81 of its accumulator volume, so that the accumulator covers 7 have to seal off a smaller narrow orifice cross section in relation to the average cross section through the accumulator body 13. By virtue of the cross-sectional narrowings 81 of the two ends of the accumulator body 15, the accumulator-cover closing force is markedly reduced, and the number of screws necessary for bracing the sealing surfaces is markedly reduced, thus making it possible to have clearly more space for switching valves in the accumulator cover 7.

As already mentioned, an accumulator cover 7 contains at least one 3/2-way valve (including, if appropriate, a 2/2-way valve for controlling the 3/2-way valve), a quantity-limiting valve, all the hydraulic connections, the holding device for the entire accumulator element 7 on the internal combustion engine and the fixing and sealing-off of the pipe-shaped accumulator body 123. Preferably, all the hydraulic or control connections in the accumulator cover 7 are arranged radially (in a space-saving way), this being made possible by a favorable design of the connecting lines or feed lines 6.

Various advantageous sealing geometries can be implemented for sealing off a pipe-shaped structural part 13 by means of an accumulator cover 7.

FIG. 4 shows that the accumulator cover 7 is designed with an inner conical surface 82 for sealing off the end-face orifice cross section of the pipe-shaped accumulator body 13, the accumulator body 13 being designed on its end faces with correspondingly directed conical surfaces 83, and the sealing-off of the accumulator body 13 being carried out by the bracing of the respective conical surfaces 82, 83 so as to form a differential angle 84. A maximum sealing action is consequently achieved radially on the inside, and the internal pressure even assists the sealing action.

FIG. 5 shows, alternatively, that the accumulator cover 7 can be designed in each case with an inner planar sealing surface 85 which can be braced with a corresponding planar end face 86 of the accumulator body 13, a supporting ring 87 being capable of being introduced coaxially around the planar sealing surfaces 85, 86 between the accumulator cover 7 and the end face of the accumulator body 13.

FIG. 6 shows, as a further alternative, that the sealing-off of the accumulator body 13 by the accumulator covers 7 may take place in each case by means of the bracing of a flat conical surface 88 together with a planar sealing surface 89. Both alternatives make it possible to optimize the sealing pressure on the inner sealing surface.

Figure 7:
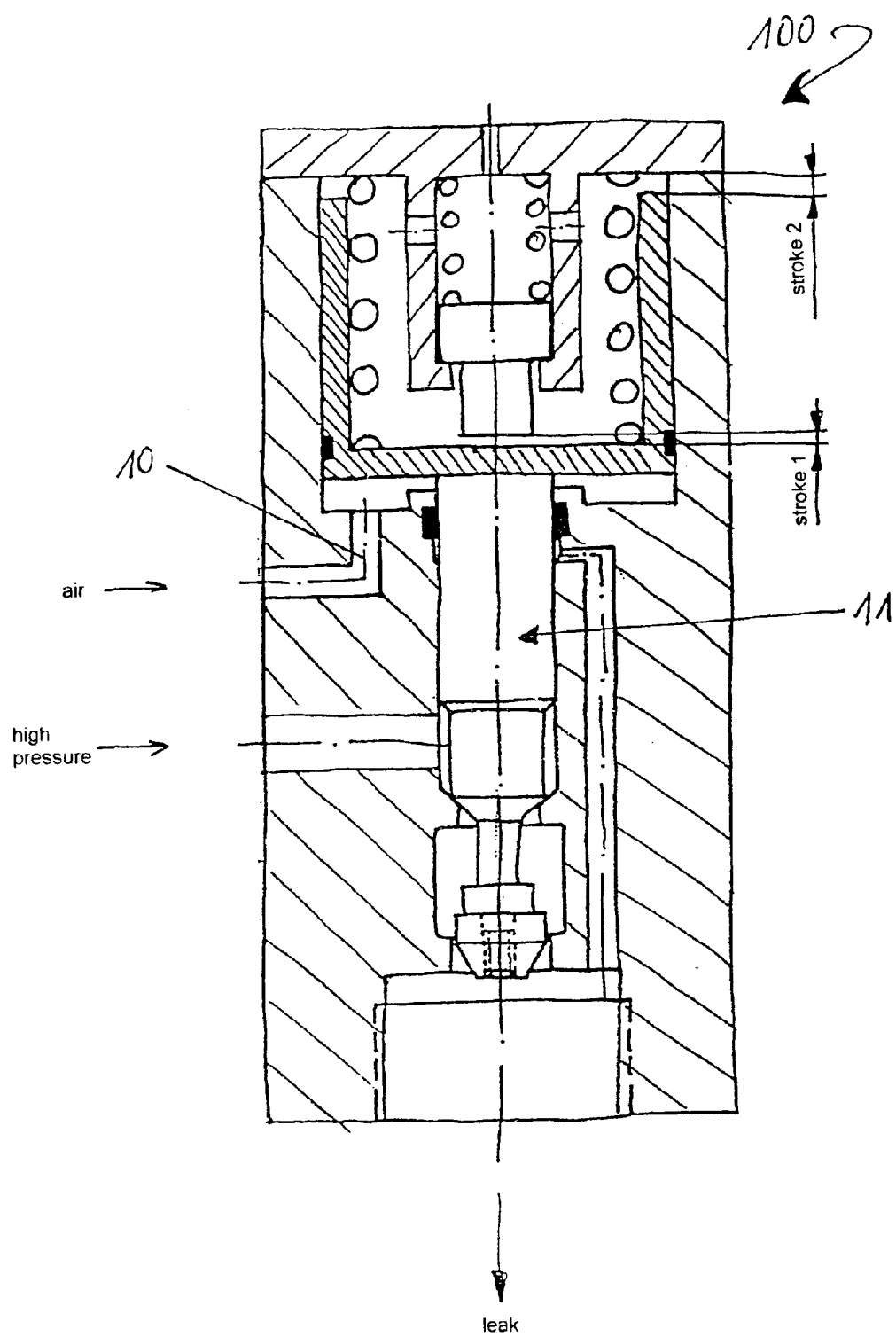
FIG. 7 shows a longitudinal section through the safety valve of the scavenging device according to the invention.

Finally, FIG. 7 shows a particularly advantageous design of the relief device 17 (FIG. 1) which combines the scavenging valve 10 or the safety valve 11 in a valve device. Directional valves are used, which, between the connections, make connections by means of adjusting movements and thereby determine the run and the direction of flow of the fuel stream. The designation of the valves depends on the number of the switching connections and the number of switching positions (3 connections, 2 switching positions 3/2-way valve).

The combined valve device 100 is to perform the following functions: a safety valve 11 is spring-loaded with an opening pressure $p_ö$=1800 bar. A scavenging valve opens with compressed air at $p_ö$=20 bar during the scavenging period. A pressure discharge valve opens by the pneumatic piston being acted upon by compressed air at $P_{min}$=6 bar.

As stated, the accumulator cover 7 comprises a valve device in the form of a 3/2-way switching valve 91 (FIG. 1). The spill quantity of the 3/2-way valve 91 is reduced by a corresponding counterpressure being applied. Spill quantities of the 3/2-way valve (and of the 2/2-way valve) are discharged via a common line routing 92 (FIG. 1), but in a hydraulically separate way. In order to achieve a closing behavior of the injection nozzle, that is to say of an injector 9, for optimum operating values of the engine, a counterpressure for the spilled fuel of the 3/2-way valve of 5 to 100 bar is optimum.

In summary, the modular concept of the fuel supply installation according to the invention has, inter alia, the following particular advantages: by the advantageous combination of the spring-loaded injection valve (injector 9) and the 3/2-way valve arranged in the accumulator cover 7, it becomes markedly simpler to equip existing engine types with common-rail injection systems. The 3/2-way valve may also optionally be arranged between the accumulator unit S and the injector 9.

By the 3/2-way valve being directly mounted on the 10 accumulator cover 7, the pressure oscillations which occur in other common-rail injection systems, particularly the end of injection, are avoided. This signifies a marked reduction in the load.

By means of the multiple actuation of the 3/2-way valve (very quick-switching valve) on the accumulator unit 5, a shaping of the injection profile or of preinjection and reinjection can also be achieved, specifically in the range of between 1 and 50° CA before the start and after the end of main injection with 0.5 to 50% of the main injection quantity.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A common rail fuel supply system for an internal combustion engine having a plurality of cylinders, said system comprising:
    a pumping device for conveying fuel from a low pressure region to a high pressure region, said pumping device comprising one of two high pressure pumps and one high pressure pump having two pump elements;
    a pressure accumulator line comprising at least two separate accumulator units and feed lines connecting said accumulator units to define a flow direction, each said accumulator unit having a pair of opposed accumulator covers and an accumulator volume for at most about two cylinders, said covers having integrated therein all functional units for fuel delivery and transfer;
    a plurality of fuel injectors for respective said cylinders, each said injector being connected to a respective one of said covers;
    a pump accumulator arranged in the high pressure region between the pumping device and the pressure accumulator line, said pump accumulator issuing hydraulically into one of said accumulator covers for fuel conveyance; and
    hydraulic means for scavenging said fuel supply system connected to one of said covers.

2. A fuel supply system as in claim 1 wherein the accumulator volume of each said accumulator unit is about 50 to 500 times the required injection quantity per cylinder and work cycle.

3. A fuel supply system as in claim 1 wherein said pump accumulator issues into the first accumulator cover of the first accumulator unit in the flow direction.

4. A fuel supply system as in claim 1 wherein said feed lines connecting said accumulator units are dimensioned so that, under nominal load, the last accumulator unit in the flow direction has an average pressure which cannot fall more than 10% below that of the first accumulator in the flow direction.

5. A fuel supply system as in claim 1 wherein said accumulator units can be acted on in series by fuel via said feed lines.

6. A fuel supply system as in claim 1 wherein said accumulator units each comprise a line pipe which extends axially between said covers and which has a throttle bore, so that all of said accumulator units can be acted on in parallel by fuel.

7. A fuel supply system as in claim 1 wherein said pressure accumulator line is aligned with the axis of the engine, each said accumulator unit having an axial length which corresponds to the cylinder spacing with a tolerance of up to 20 percent.

8. An accumulator unit for a common rail pressure accumulator line, said accumulator unit comprising:
    a pipe-shaped accumulator body having a pair of opposed end faces, each said end face having an orifice; and
    a pair of accumulator covers closing respective said orifices, each said accumulator cover comprising all connections for forming the line, all functional units for fuel delivery and transfer, and all control means for forming the line.

9. An accumulator unit as in claim 8 wherein each of said orifices has a cross section which narrows toward said cover, so that said covers close a smaller cross section than the cross section of said body between said ends.

10. An accumulator unit as in claim 8 wherein each of said accumulator covers has an inner conical surface for sealing a respective said orifice, each said end face having a corresponding conical surface surrounding said orifice, said conical surface of said accumulator cover and said conical surface of said end face forming a differential angle therebetween.

11. An accumulator unit as in claim 8 wherein each said end faces of said accumulator body comprises a planar end face, and each of said accumulator covers comprises a planar sealing surface which can be braced against said planar end face with a supporting ring coaxially therebetween.

12. An accumulator unit as in claim 8 wherein one of said end faces and said accumulator covers comprises respective conical surfaces and the other of said end faces and said accumulator covers comprise respective planar sealing surfaces, said conical surfaces and said planar sealing surfaces being braced together to seal the accumulator covers against the accumulator body.

13. An accumulator unit as in claim 8 wherein said connections for forming the high pressure line extend radially with respect to said accumulator body.

14. An accumulator body as in claim 8 wherein said functional units comprise a 3/2-way switching valve in each of said covers.

15. An accumulator body as in claim 14 wherein said functional units further comprise a 2/2-way valve for switching said 3/2 way valve.

16. A fuel supply system as in claim 1 wherein said pumping device comprises two high pressure pumps which convey fuel from a low pressure region to said pump accumulator via two respective pump lines.

17. A fuel supply system as in claim 1 comprising a scavenging circuit, said scavenging circuit comprising:

a safety valve connected to a cover of one of said accumulator covers and to said low pressure region; and a scavenging valve connected to said one of said covers and to said low pressure region and operated by compressed air.

18. A fuel supply system as in claim 17 wherein said safety valve and said scavenging valve are connected to the cover of the last accumulator unit in the flow direction.

* * * * *

UNITED STATES PATENT AND TRADEMARK OFFICE
CERTIFICATE OF CORRECTION

PATENT NO. : 6,776,140 B2
DATED : August 17, 2004
INVENTOR(S) : Ludwig Maier

It is certified that error appears in the above-identified patent and that said Letters Patent is hereby corrected as shown below:

<u>Title page,</u>
Item [73], Assignee, should read as follows:
-- [73]   Man B&W Diesel Aktiengesellschaft, Augsburg (DE) --

Signed and Sealed this

Fifteenth Day of March, 2005

JON W. DUDAS
*Director of the United States Patent and Trademark Office*

UNITED STATES PATENT AND TRADEMARK OFFICE
CERTIFICATE OF CORRECTION

PATENT NO.    : 6,776,140 B2
DATED         : August 17, 2004
INVENTOR(S)   : Ludwig Maier et al.

It is certified that error appears in the above-identified patent and that said Letters Patent is hereby corrected as shown below:

<u>Title page,</u>
Item [75], Inventors should read
-- Ludwig Maier, Diedorf (DE)
Christian Vogel, Augsburg (DE)
Christian Schrott, Augsburg (DE)
Matthias Songen, Augsburg (DE)
Jaroslav Hlousek, Golling (AT);
Bernd Kögler, Hallein (AT);
Christian Graspeunter, Hallein (AT);
Hagen Sassnick, Puch (AT) --

Signed and Sealed this

Tenth Day of May, 2005

JON W. DUDAS
*Director of the United States Patent and Trademark Office*